July 2, 1940.   O. H. FOWLER   2,206,604

BRAKE

Filed Aug. 20, 1937

INVENTOR
*OWEN H. FOWLER*
BY
ATTORNEY

Patented July 2, 1940

2,206,604

UNITED STATES PATENT OFFICE 2,206,604

BRAKE

Owen H. Fowler, Detroit, Mich., assignor to Hydraulic Brake Company, Detroit, Mich., a corporation of California Application August 20, 1937, Serial No. 160,184

7 Claims. (Cl. 188—152)

This invention relates to brakes, and more particularly to internal expanding brakes.

In the conventional internal expanding brake, wherein the applied force is distributed between two braking shoes so that the braking obtained is the sum of the friction on the two shoes, the forward braking shoe is more effective than the trailing or reverse braking shoe. This is due to the wiping action of the drum causing self-actuation of the forward braking shoe and tending to repel the trailing brake shoe.

The present invention comprehends the utilization of this self-actuating feature by arranging the brake shoes in tandem, that is, with the toe of one of the brake shoes adjacent the heel of the other braking shoe so that the applied force when distributed between the shoes may be augmented by the self-actuation of the shoes. This is particularly desirable in brakes for airplanes, wherein reverse braking is non-essential.

An object of the invention is to provide braking structure wherein maximum efficiency may be attained.

Another object of the invention is to provide braking structure wherein the friction elements may be applied with equal force and effect.

Another object of the invention is to provide a braking structure including two friction elements, both operative as forward braking elements.

A further object of the invention is to provide means for simultaneously applying equal operating force to brake shoes mounted on diametrically disposed pivots.

Yet a further object of the invention is to provide a brake structure having but few component parts of simple structure so that its manufacture may be economically facilitated both as to parts and assembly.

Other objects and features of the invention will appear from the following description taken in connection with the drawing forming a part of this specification, and in which—

Figure 1:
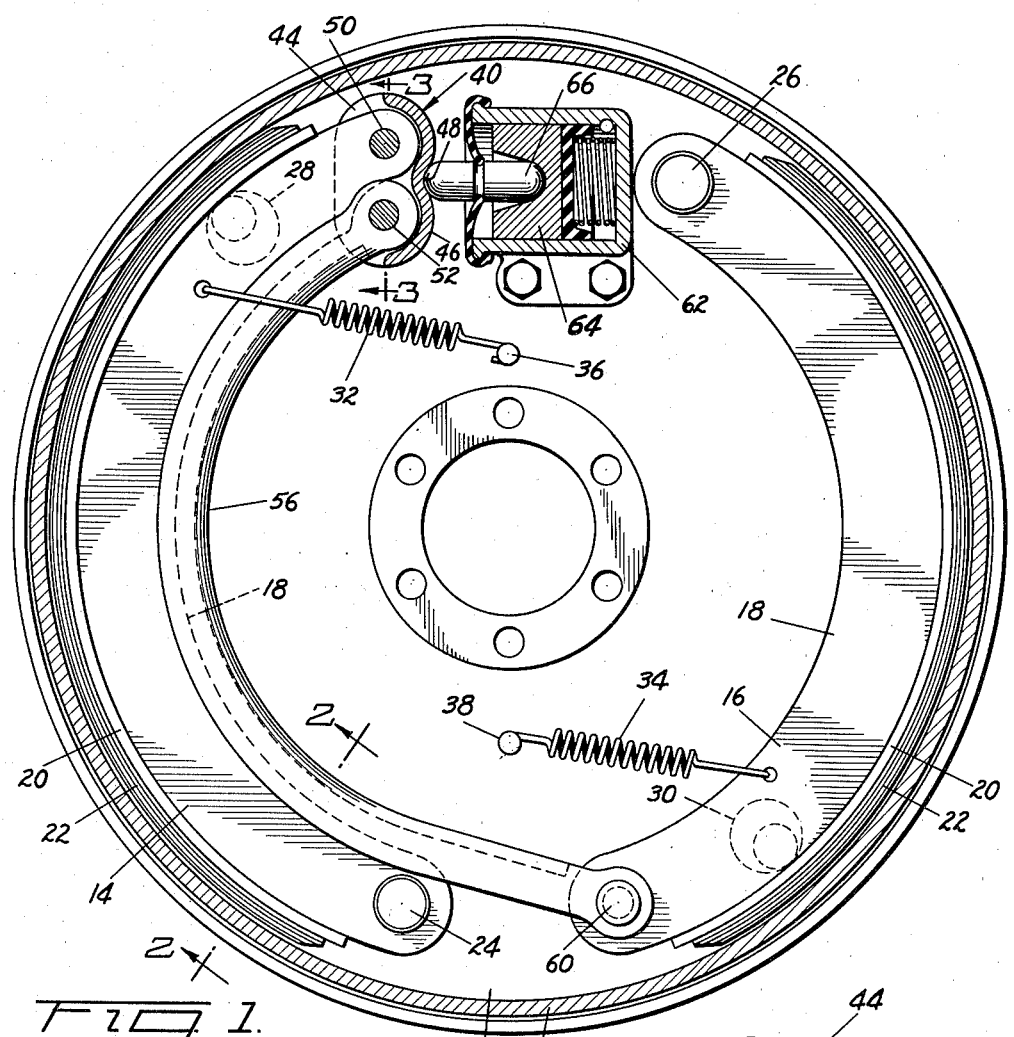
Fig. 1 is a sectional view of a brake taken just back of the head of the drum illustrating the invention as applied.
Figure 2:
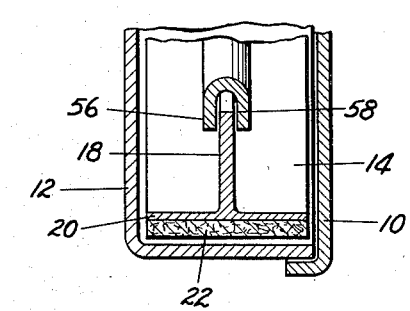
Fig. 2 is a vertical sectional view substantially on line 2—2, Fig. 1.
Figure 3:
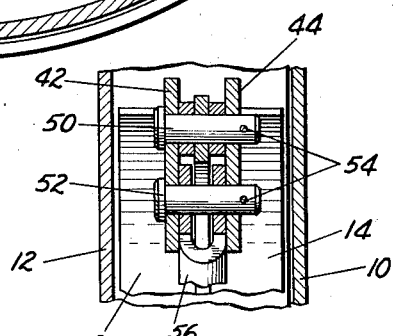
Fig. 3 is a sectional view substantially on line 3—3, Fig. 1.

Referring to the drawing for more specific details of the invention, 10 represents a fixed support or backing plate having associated therewith a rotatable drum 12, which may be secured to a wheel, not shown. Positioned for movement on the backing plate are a pair of corresponding interchangeable friction elements or shoes 14 and 16 adaptable for cooperation with the drum.

Each of the shoes includes a web 18 supporting a rim 20 to which is suitably secured a lining 22. The articulate ends of the shoes are pivoted on diametrically disposed anchors 24 and 26 arranged on the backing plate, and suitable retractile stops 28 and 30, also arranged on the backing plate, serve to support the shoes in proper spaced relation to the drum when the brake is at rest. Retractile springs 32 and 34, connecting the respective shoes adjacent their force applying ends to fixed supports 36 and 38 arranged on the backing plate, serve to return and retain the shoes on the stops 28 and 30 upon completion of a braking operation.

An equalizer 40 preferably includes spaced plates 42 and 44 connected as by a web 46 having a centralized depression 48. The plates are transversely bored to provide corresponding spaced registering openings arranged equi-distant from the depression 48 in the web 46. These openings receive suitable pivot pins 50 and 52 secured against displacement as at 54, and the force applying end of the shoes 14 is pivotally connected to the pivot pin 50.

A lever 56 slidably supported on the web 18 and the shoe 14 preferably includes a strip of metal bent upon itself to provide a channel 58 and so deformed as to correspond to the curvature of the inner perimeter of the web. The channel 58 receives the web with small clearance so as to provide for free relative movement between the shoes and the lever, and to eliminate chatter and other objectionable noises. One end of the lever 56 is connected to the pivot pin 52 of the equalizer 40, and the other end of the lever is pivotally connected to the force applying end of the shoe 16 as indicated at 60.

Means for actuating the shoe include a fluid pressure producing device of conventional type, not shown, and a fluid pressure actuated motor, also of conventional type, operatively connected to the fluid pressure producing device. The motor includes a cylinder 62 suitably mounted on the backing plate, a piston 64 movable in the cylinder, and a thrust pin 66 having one end seated in a recess in the back of the piston and its other end seated in the recess 48 of the equalizer 40.

In operation, upon actuation of the fluid pressure producing device, fluid under pressure is received in the fluid pressure actuated motor, resulting in movement of the piston 64 on its compression stroke, and this movement of the piston is transmitted through the thrust pin 66 to the equalizer 40. This equalizer 40 functions to distribute the force thus produced equally between the shoe 14 and the lever 56. This causes actuation of the shoe 14 into engagement with the drum 12 against the resistance of the retractile spring 32, and at the same time the force exerted on the lever 56 is transmitted through the lever, slidable on the web 18 of the shoe 14, to the shoe 16, resulting in actuation of the shoe into engagement with the drum against the resistance of the retractile spring 34. Thus both shoes are actuated as forward braking shoes. Hence the applied force is augmented by the actuation of the shoes.

Upon conclusion of a braking operation, the applied force is released, and the fluid in the fluid pressure actuated motors is returned to the fluid pressure producing device under the influence of the retractile springs 36 and 34 as the shoes move to their retracted or off position against the stops 28 and 30, and during this movement of the shoes the lever 58 slides on the web 18 of the shoe 14 to its position of rest.

Although this invention has been described in connection with certain specific embodiments, the principles involved are susceptible of numerous other applications that will readily occur to persons skilled in the art. The invention is, therefore, to be limited only by the scope of the appended claims.

Having thus described the various features of the invention, what I claim as new and desire to secure by Letters Patent is:

1. A brake comprising a fixed support, a pair of shoes pivoted on the support in tandem, and means slidably supported on one of the shoes and connected to the force applying ends of the shoes for actuating the shoes simultaneously and with equal effectiveness.

2. A brake comprising a fixed support, a pair of shoes mounted thereon in tandem, a lever slidable on one of the shoes and connected to the other shoe, an equalizer connected between the lever and the shoe supporting the lever, and means for applying force to the equalizer.

3. A brake comprising a fixed support, a pair of shoes mounted thereon in tandem, a lever pivotally connected to one of the shoes and slidable on the other shoe, an equalizer connected to the lever and to the shoe supporting the lever, and a force applying means operatively connected to the equalizer.

4. A brake comprising a fixed support, a drum associated therewith, shoes pivoted on the support in tandem for cooperation with the drum, an equalizing mechanism connected between the diametrically disposed force applying ends of the shoes including a lever slidable on one of the shoes, and means for applying force to the equalizer.

5. A brake comprising a fixed support, a drum associated therewith, a pair of shoes mounted in tandem on the support for cooperation with the drum, a lever slidably supported on one of the shoes and connected to the force applying end of one of the shoes, an equalizer connecting the lever to the force applying end of the shoe supporting the lever, and a motor operatively connected to the equalizer.

6. A brake comprising a pair of shoes arranged in tandem, a lever pivotally connected to one of the shoes and slidably embracing the other shoe, an equalizer connected between the lever and the shoe embraced by the lever, and a fluid pressure actuated motor operatively connected to the equalizer.

7. A brake comprising a backing plate, a rotatable drum associated therewith, a pair of shoes pivotally supported on the backing plate in tandem for cooperation with the drum, a lever slidably embracing the web of one of the shoes and connected to the force applying end of the other shoe, an equalizer connecting the lever to the force applying end of the shoe embraced by the lever, and a fluid pressure actuated motor connected to the equalizer.

OWEN H. FOWLER.